US011230390B2

(12) United States Patent
Yim et al.

(10) Patent No.: US 11,230,390 B2
(45) Date of Patent: Jan. 25, 2022

(54) BAGGAGE RECORDING SYSTEM

(71) Applicant: E-Business Solutions Limited, Hong Kong (CN)

(72) Inventors: Ngok Hon Yim, Hong Kong (CN); Kam Hing Lee, Hong Kong (CN); Man Chung Chan, Hong Kong (CN)

(73) Assignee: E-Business Solutions Limited, Hong Kong (CN)

( * ) Notice: Subject to any disclaimer, the term of this patent is extended or adjusted under 35 U.S.C. 154(b) by 281 days.

(21) Appl. No.: 16/487,080

(22) PCT Filed: Dec. 20, 2018

(86) PCT No.: PCT/CN2018/122262
§ 371 (c)(1),
(2) Date: Aug. 19, 2019

(87) PCT Pub. No.: WO2019/134523
PCT Pub. Date: Jul. 11, 2019

(65) Prior Publication Data
US 2021/0130009 A1 May 6, 2021

(30) Foreign Application Priority Data

Jan. 4, 2018 (HK) ................................. 18100121.2

(51) Int. Cl.
*G06Q 30/00* (2012.01)
*G06Q 90/00* (2006.01)
(Continued)

(52) U.S. Cl.
CPC ............... *B64F 1/368* (2013.01); *B25J 9/042* (2013.01); *B25J 19/027* (2013.01);
(Continued)

(58) Field of Classification Search
CPC ............... G06Q 10/08; G06Q 10/0833; G06K 7/10366; G06K 7/10217; G06K 7/10356;
(Continued)

(56) References Cited

U.S. PATENT DOCUMENTS

2003/0189094 A1* 10/2003 Trabitz ................... G06Q 10/08
235/385
2006/0028344 A1* 2/2006 Forster ................ G06K 19/045
340/572.7
(Continued)

FOREIGN PATENT DOCUMENTS

CN 101891052 11/2010
CN 104361693 2/2015
(Continued)

*Primary Examiner* — Tuyen K Vo
(74) *Attorney, Agent, or Firm* — Eagle IP Limited; Jacqueline C. Lui; Jennifer G. Che

(57) ABSTRACT

An airport baggage recording system. The airport baggage recording system comprises a telescopic robotic arm that loads airport baggage. The robotic arm has one end connected to an upright by a pivot and a second end connected to a disc. A radio frequency identification (RFID) reader is located in the disc that reads RFID tags on the airport baggage when the airport baggage is placed on the disc during loading. Another RFID reader is located on the pivot that reads the RFID tags on the airport baggage when the airport baggage is placed on the disc during loading. The RFID reader in the disc and the RFID reader on the pivot both read the RFID tags on the airport baggage to prevent errors in reading the RFID tags on the airport baggage during loading.

9 Claims, 7 Drawing Sheets

(51) Int. Cl.
  *G06F 17/00* (2019.01)
  *B64F 1/36* (2017.01)
  *B25J 9/04* (2006.01)
  *B25J 19/02* (2006.01)
  *G06K 7/10* (2006.01)
  *G06K 17/00* (2006.01)

(52) U.S. Cl.
  CPC ..... *G06K 7/10336* (2013.01); *G06K 7/10356* (2013.01); *G06K 7/10445* (2013.01); *G06K 7/10475* (2013.01); *G06K 17/0022* (2013.01)

(58) Field of Classification Search
  CPC ........... G06K 17/0022; G06K 7/10039; G06K 7/10336; G06K 7/10376; G06K 7/10425; G06K 7/10445; G06K 7/10475; B64F 1/368; B64F 1/32
  See application file for complete search history.

(56) References Cited

U.S. PATENT DOCUMENTS

| | | | |
|---|---|---|---|
| 2009/0295544 A1* | 12/2009 | Bayer | G06Q 10/08 340/10.1 |
| 2010/0007468 A1* | 1/2010 | Yanagawa | G06K 17/0029 340/10.1 |
| 2011/0088996 A1 | 4/2011 | Hoene | |
| 2012/0022684 A1* | 1/2012 | Hernot | G07F 7/0636 700/225 |
| 2012/0056720 A1 | 3/2012 | Barvick et al. | |
| 2012/0098642 A1* | 4/2012 | Krawczewicz | G06K 19/07707 340/10.1 |
| 2014/0164176 A1 | 6/2014 | Kitlyar | |

FOREIGN PATENT DOCUMENTS

| | | |
|---|---|---|
| CN | 204604355 | 9/2015 |
| CN | 105807713 | 7/2016 |
| CN | 106529625 | 3/2017 |
| CN | 206492716 | 9/2017 |
| HK | 1243870 | 7/2018 |
| WO | 2011136612 | 11/2011 |
| WO | 2015037987 A1 | 3/2015 |

* cited by examiner

United States Patent US 11,230,390 B2

BAGGAGE RECORDING SYSTEM

FIELD OF THE INVENTION

The present invention relates to a baggage recording system, and more particularly to a RFID baggage recording system.

BACKGROUND

Radio frequency identification (RFID) is an automatic identification technology that stores and remotely retrieves data from electronic tags using radio waves. RFID chips can store substantially more data than barcodes and can be read from a distance.

More and more airports are using RFID tags for recording and tracking baggage as the RFID tags offer many benefits. Unlike barcode-only tags, which require the scanner to be in close proximity to the tag, RFID tags can be read from a distance and at an angle. Moreover, RFID tags can be read more quickly, contain more data and are more reliable, with read-rates much higher than the barcode-only tags.

New devices and systems that provide an efficient, convenient, and accurate way to record the information in the baggage RFID tag automatically during a robotic arm-assisted loading will meet demanding operational needs, advancing technological needs and solve technological problems.

SUMMARY OF THE INVENTION

One example embodiment provides an airport baggage recording system. The airport baggage recording system includes a telescopic robotic arm that loads airport baggage. The robotic arm has one end connected to an upright by a pivot and a second end connected to a disc. A radio frequency identification (RFID) reader is located in the disc that reads RFID tags on the airport baggage when the airport baggage is placed on the disc during loading. Another RFID reader is located on the pivot that reads the RFID tags on the airport baggage when the airport baggage is placed on the disc during loading. The RFID reader in the disc and the RFID reader on the pivot both read the RFID tags on the airport baggage to prevent errors in reading the RFID tags on the airport baggage during loading.

Other example embodiments are discussed herein.

DETAILED DESCRIPTION

Figure 1A:
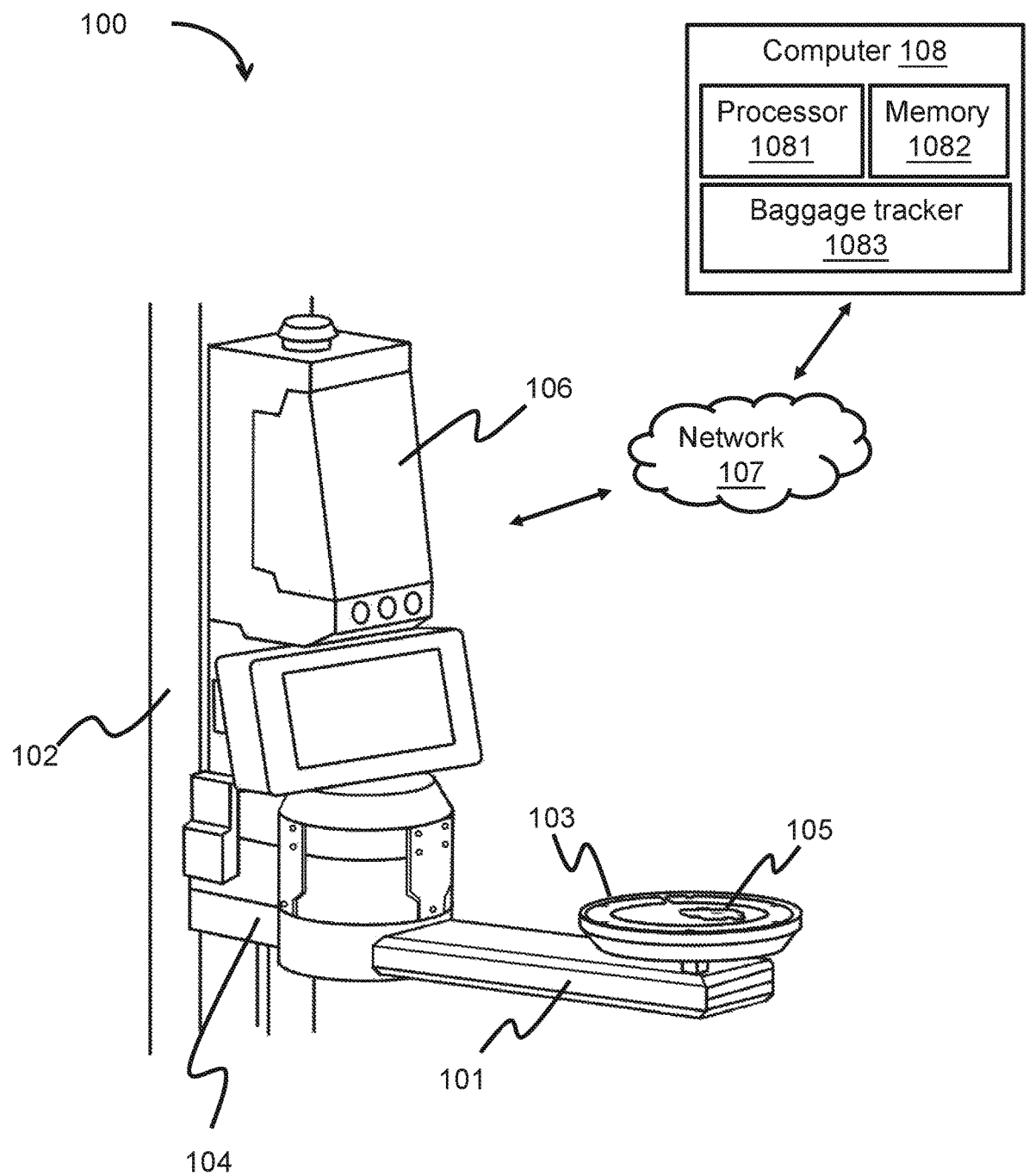
FIG. 1A illustrates an airport baggage recording system in accordance with an example embodiment.

Example embodiments relate to methods, devices, and systems that automatically read and record information in cargo, luggage, or other objects having an RFID tag. Such information is read and recorded with high accuracy using a robotic arm-assisted loading process.

Example embodiments provide examples of cargo as being airport baggage. Example embodiments, however, are not limited to airport baggage or a particular type of cargo. Various types of movable object can be fitted with or include an RFID tag or other readable tag and executed as part of an example embodiment. Further, example embodiments can be executed in locations other than airports, such as loading docks, warehouses, factories, and other locations where objects are loaded, unloaded, and tracked.

More and more airports in the world are using RFID tags due to the efficiency and accuracy brought by RFID technology. When a piece of baggage is registered, the tag's RFID inlay is programmed with a unique ID number. The ID number of the RFID corresponds to the data in the airport back-end handling system, such as the passenger's name, flight number, date, terminal airport, and other information. The information is retrieved whenever the baggage tag is read by an RFID reader. Normally there are stationary RFID readers setting upon a conveyor to read the RFID tags when the baggage is passing by.

In the airport baggage transportation process, all checked-in and transferred baggage are moved to a baggage handling facility to be loaded into containers, such as a unit load device (ULD). Baggage information stored in the RFID tags should be recorded and associated with an ID of a container that receives the baggage. Meanwhile, all the information should be verified with the airport back-end handling system to confirm the properly loading of the baggage.

Conventionally, both loading the baggage into the container and recording of the baggage information during the loading are made manually by manpower. Ordinary baggage weighing up to 32 kg are transported by handling operators to containers manually for loading onto the aircraft, which is a labor-intensive task since an international airport may handle tens of thousands of pieces of baggage every day.

Instead of loading the baggage manually, a robotic arm supervised by an operator is introduced to assist the loading and reduce manual labor for the time-consuming baggage handling tasks. The robotic arm is movable along the conveyor and can be positioned in front of a container as required. A force of only a few kilograms is needed to load the baggage from the conveyor to the robot arm. Then the robot arm that carries the baggage is directed by an operator to transport the baggage into a designated container.

The robotic arm can significantly lessen the operator's physical workload, hence reducing the risk of strain and injuries caused by heavy lifting, and optimize the baggage handling process. However, in the robot-assisted loading process, the airport baggage is in a rather dynamic environment, e. g., the position of loading is changing with the parking position of the container from time to time. Further, the RFID readers for reading and recording the baggage tags cannot be stationary and are required to be mobile and flexible.

Manually scanning of the RFID tags is a tedious work with low efficiency. A more convenient, accurate and effective device and system attached with the movable robotic arm that read and record the baggage RFID tags automatically is desirable to optimize the baggage loading process.

Example embodiments solve one or more of the technical problems associated with present baggage recording systems as set forth above. One or more example embodiments achieve baggage recording methods, apparatus, and systems with improved performance by embedding a baggage recording system into a robotic arm to contribute to baggage recording technology. The baggage recording is performed automatically during the process of the robotic-arm assisted loading. Redundant RFID reading ensures high read-rates and reduces the error. The baggage recording system is movable with the robotic arm, and thus adapts to the dynamic environment of baggage loading.

In one example embodiments, an airport baggage recording system comprises a telescopic robotic arm that loads airport baggage. The robotic arm has one end connected to an upright by a joint or a pivot, and a second end connected to a disc. When the robotic arm is positioned between a container and a conveyor and gets ready to work, the baggage is moved from the conveyor onto the disc by an operator. The robotic arm transports the baggage loaded on the disc into the container by making rotational motion and/or translational displacement.

The airport baggage recording system further comprises a RFID reader in the disc. The RFID reader reads RFID tags on the airport baggage when the airport baggage is placed on the disc during loading or unloading.

The airport baggage recording system further comprise a RFID reader located on the pivot. The RFID reader on the pivot reads the RFID tags on the airport baggage when the airport baggage is placed on the disc during loading or unloading.

In the airport baggage recording system, the RFID reader in the disc and the RFID reader on the pivot both read the RFID tags on the airport baggage to prevent errors in reading the RFID tags on the airport baggage during loading, and thus improve the accuracy of recording.

In one embodiment for example, the disc includes an upper layer to make a baggage-friendly support. The disc also includes a lower layer. The RFID reader in the disc is located between the upper layer and the lower layer.

In one embodiment for example, the disc has a flat surface that receives the airport baggage during loading. The disc includes a plurality of antennas that deliver communication between the RFID reader and tag. The antennas are embedded inside the disc and separated from each other in the disc.

In one embodiment for example, the RFID reader in the disc includes two antennas that are located opposite each other and distributed on an outer periphery of the disc.

In one embodiment for example, the RFID reader in the disc includes at least two antennas that are separated from each other and equally spaced apart around an edge of the disc, such that each of the antennas reads a different area above the disc.

In one embodiment for example, the RFID reader in the disc and the RFID reader on the pivot simultaneously read the RFID tags on the airport baggage to perform redundant reads of the RFID tags in order to reduce errors in reading the RFID tags.

In one embodiment for example, the RFID reader in the disc includes two or more antennas. Each of the antennas is a sinusoidal meandered dipole to improve reading of different orientations of the RFID tags on the airport baggage during loading.

In one embodiment for example, the disc includes a mounting ring. The mounting ring is located inside the disc along a periphery of the disc. The mounting ring supports a plurality of antennas. The mounting ring also includes a coaxial cable that extends between the plurality of antennas.

In one embodiment for example, the disc includes a mounting ring that supports an antenna. The inner diameter of the mounting ring is 290 mm. The outer diameter of the mounting ring is 376 mm.

In one embodiment for example, the airport baggage recording system further comprises a computer that includes a processor, a memory and a baggage tracker. The computer communicates with the RFID reader located on the pivot by network and associates the baggage with a container.

FIG. 1A illustrates an airport baggage recording system 100 in accordance with an example embodiment.

The airport baggage recording system 100 includes a telescopic robotic arm 101. The robotic arm 101 has one end connected to an upright 102 by a pivot 104 and a second end connected to a disc 103. The disc 103 is for receiving an airport baggage during loading. When a piece of airport baggage is placed onto the disc 103, the robot arm 101 makes translational movement, for example, moving up/down along the upright and moving towards/away from the upright, and/or rotational movement such as rotating around the upright by the pivot 104 to send the airport baggage on the disc 103 into a container where the airport baggage is loaded.

The airport baggage recording system 100 further includes a RFID reader 105. The RFID reader 105 is located in the disc 103. The RFID reader 105 reads RFID tags on the airport baggage when the airport baggage is placed on the disc 103 during loading.

The airport baggage recording system 100 further includes a RFID controller 106 that is located on the pivot 104. For example, the RFID controller 106 is mounted on the pivot 104 by a plurality of screws. In an example embodiment, the RFID controller 106 has a height in the range of 650 mm to 750 mm, a width in the range of 270 mm to 280 mm and a thickness in the range of 240 mm to 250 mm.

Figure 1B:
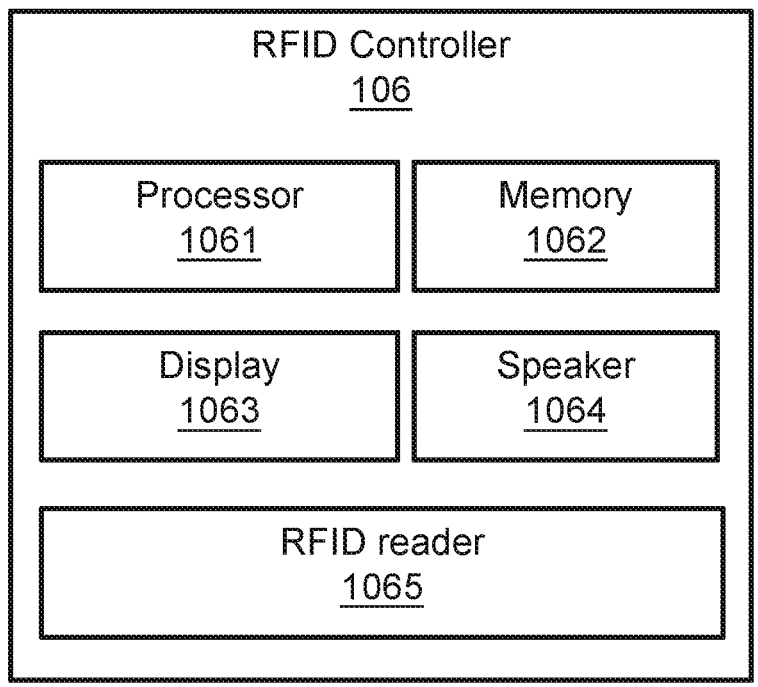
FIG. 1B illustrates a RFID controller in accordance with an example embodiment.

In an example embodiment, the RFID controller 106 includes a processor, a memory, a RFID reader and a display. FIG. 1B illustrates a RFID controller 106 shown in FIG. 1A in accordance with an example embodiment. The RFID controller 106 comprises a processor 1061, a memory 1062, a display 1063 and a RFID reader 1065.

The RFID reader 1065 in the RFID controller 106 reads RFID tags on the airport baggage when the airport baggage is placed on the disc 103 during loading. The information is saved in the memory 1062 of the RFID controller 106 and shown on the display 1063.

In an example embodiment, when the RFID reader 105 reads the RFID tags on the airport baggage and extracts information inside in the RFID tags, the information is transmitted wirelessly to the RFID controller 106. The RFID controller 106 receives the information, saves the information in the memory and shows the information on the display 1063.

In an example embodiment, the airport baggage recording system 100 further comprises a computer 108. The computer 108 includes a processor 1081 and a memory 1082. The computer 108 is connected via network 107, for example, a wireless network, with one or more RFID controller 106 and an airport back-end handling system as a bridge for communication therebetween. The computer 108 receives loading information from the RFID controller 106 and sends the information to the airport back-end handling system, and receives indications from the airport back-end handling system and sends the indications back to the RFID controller 106.

By way of example, the computer 108 monitors the working status of the airport baggage recording system 100. The RFID controller 106 is set to send a signal to the computer 108 at a predetermined interval. The interval, for example, is 2 seconds. If the computer 108 did not receive the signal at the predetermined interval, then it considers the airport baggage recording system 100 not working properly. In the meantime, the airport back-end handling system monitors the working status of the computer 108 in a similar way by requesting a response from the computer 108 at regular intervals.

In an example embodiment, the computer 108 further comprises a baggage tracker 1083 that tracks the position of the airport baggage recording system 100 for associating the container in service with the baggage loaded in the container.

During the robotic-arm assisted loading/unloading process, the loading area along the lateral of the conveyor is divided into reading zones which are continuous and non-overlapping. The position of each reading zone is uniquely registered in the computer 108. When a container is opened for baggage loading, the ID of the container is associated with a specific reading zone.

In an example embodiment, the baggage tracker 1083 includes a position sensor that is mounted at one side of the loading area. The baggage tracker 1083 determines the position of the airport baggage recording system 100 in the loading area, and sends the position information to the processor 1081 and the memory 1082. The processor 1081 calculates the reading zone where the airport baggage recording system 100 is located in according to the position information and all the baggage loaded in the reading zone is counted to the container associated therewith.

Data read from the tags is transmitted to the airport back-end handling system that stores and tracks information about the baggage, such as physical location in the airport, airline, flight number, gate number, owner of baggage, and other information associated with the baggage. This information is stored in a central server or computer as the data is gathered from many different RFID readers, sensors, computer inputs, etc. located throughout the airport and baggage handling facility.

In an example embodiment, the RFID reader 105 and the RFID controller 106 read the RFID tags on the airport baggage simultaneously. The redundant reading is performed to reduce errors in reading the RFID tags and improve the accuracy of the airport baggage recording system 100.

In an example embodiment, when the RFID controller 106 receives information of the airport baggage from the RFID reader 105, it communicates through a wireless network with the computer 108 to confirm the information of the airport baggage. If the information is correct, a green light on the RFID controller 106 will light on, and if the information is not correct, a red light on the RFID controller 106 will light on.

When a baggage tag is successfully read, the display 1063 in the RFID controller 106 shows the information stored in the baggage tag, such as a license plate number (LPN), together with an associated container number of the container being loaded. If the baggage information is correct, the display 1063 shows a green background, and if the information is not correct, the display 1063 shows a red background.

In situation that the RFID tags on the airport baggage cannot be read, no baggage tag information is shown on the display 1063. Then the airport baggage should not be loaded and should be reserved for manually recording. When the baggage recording system 100 is out of order, the display 1063 pops up a reminder of system error.

In an example embodiment, the RFID controller 106 further includes a speaker 1064, as shown in FIG. 1B. The speaker 1064 plays indicators and alarms received from the computer 108 that communicates with the airport back-end handling system.

In an example embodiment, the RFID controller 106 further includes a stop button. When the loading for a container is completed, the RFID controller 106 sends a signal to inform the computer 108 to close the container upon pressing the stop button.

Figure 2:
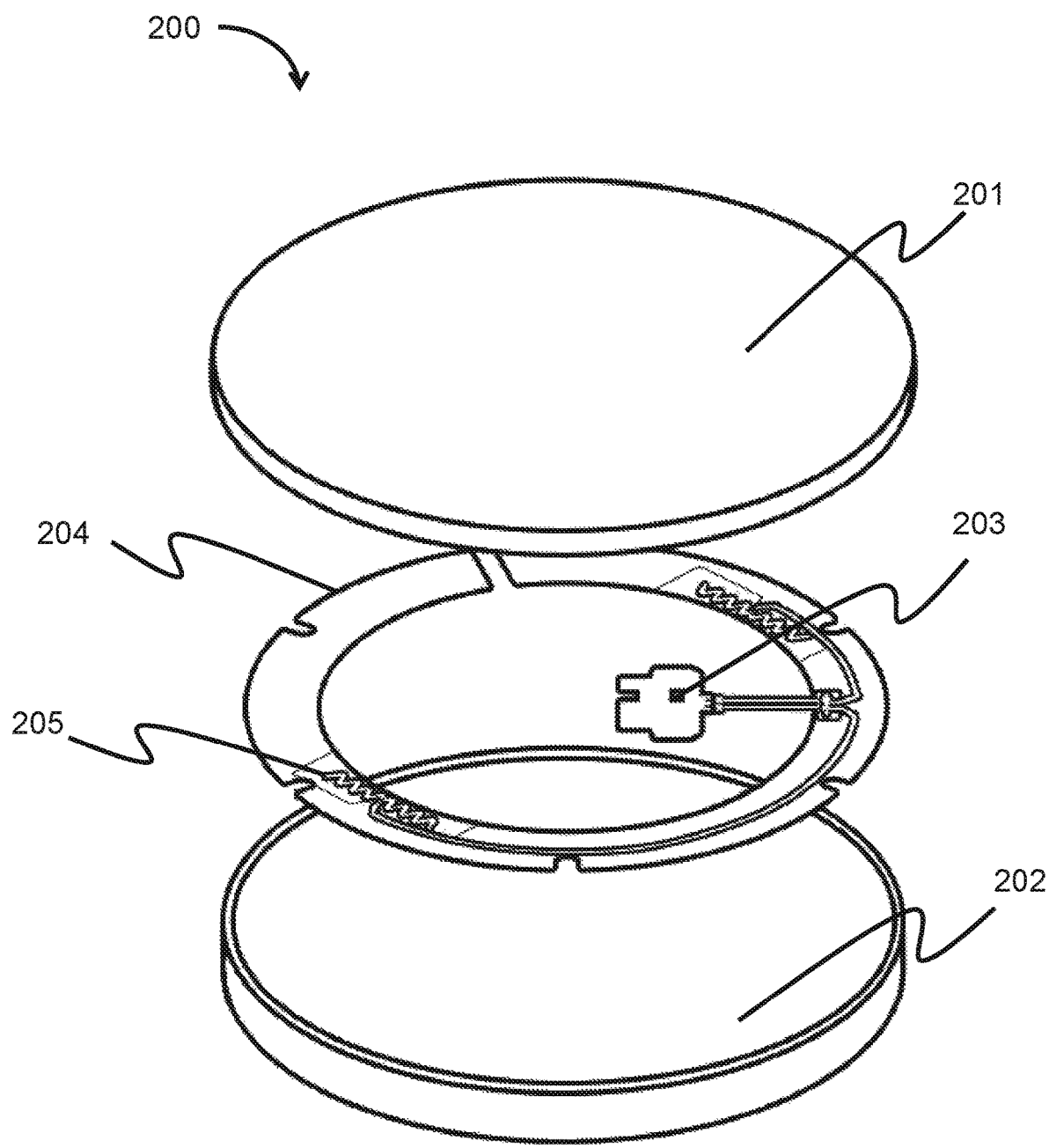
FIG. 2 illustrates an exploded view of a disc in accordance with an example embodiment.

FIG. 2 illustrates an exploded view of a disc 200 in accordance with an example embodiment. The disc 200 includes an upper layer 201, a lower layer 202, a RFID reader 203 and a mounting ring 204.

The upper layer 201 and the lower layer 202 both have circular shape and are stacked together concentrically. The RFID reader 203 is connected to the mounting ring 204 that is located between the upper layer 201 and the lower layer 202. The mounting ring 204 is fixed on the lower layer 202, for example, by a plurality of screws.

In an example embodiment, the RFID reader 203 includes a plurality of antennas 205 that reads an area above the disc 200.

In an example embodiment, the disc 200 has a flat surface that receives the airport baggage during loading. The disc 200 has a diameter larger than 376 mm.

Figure 3:
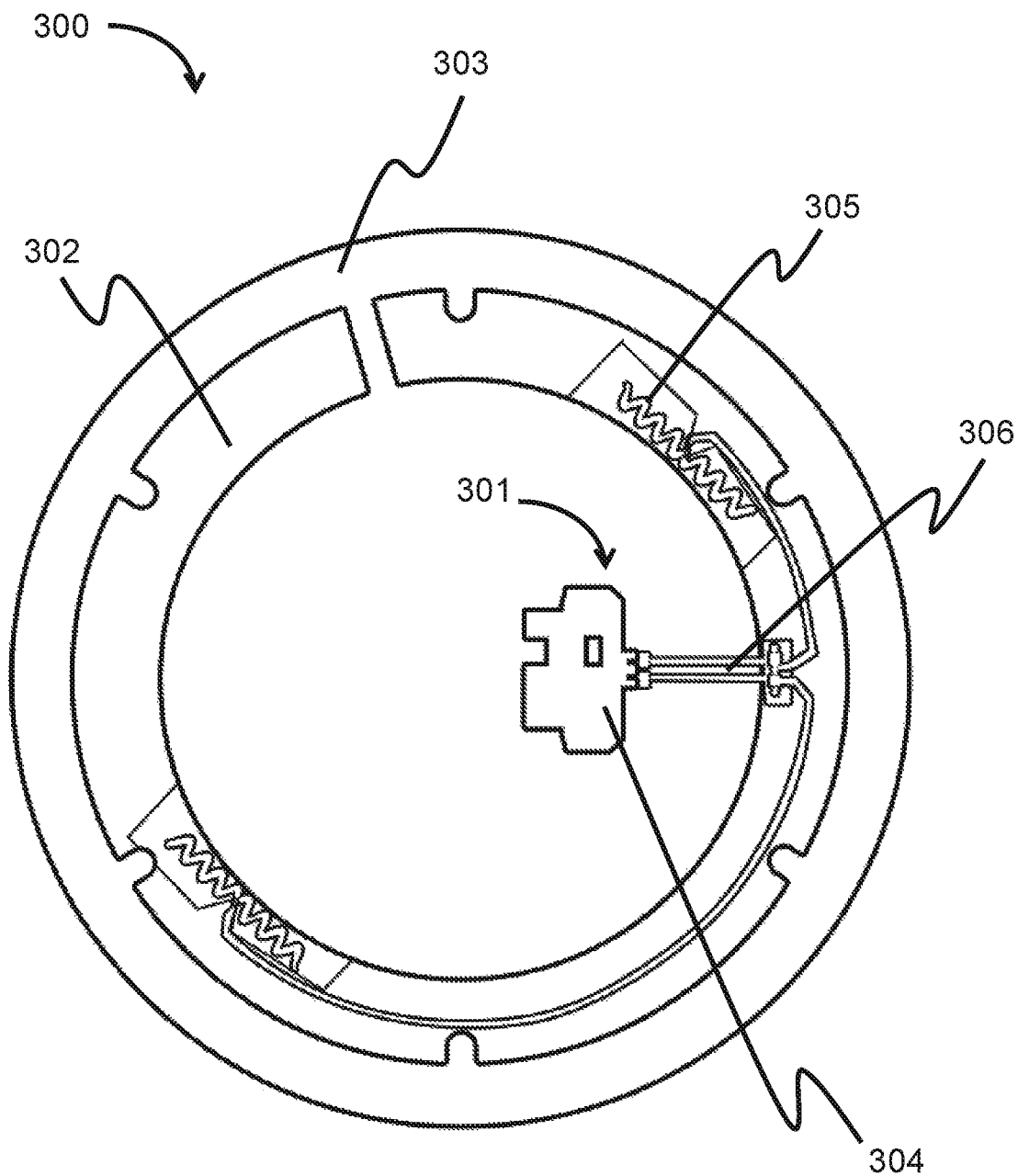
FIG. 3 illustrates a sectional top view of a disc in accordance with an example embodiment.

FIG. 3 illustrates a sectional top view of a disc 300 in accordance with an example embodiment. The disc 300 comprises a RFID reader 301 that transmits and receives baggage information from airport baggage tags, a mounting ring 302 that holds an antenna 305, and a lower layer 303 for supporting the mounting ring 302.

In an example embodiment, the RFID reader 301 includes a circuit board 304, a plurality of antennas 305 and coaxial cables 306 that connects the circuit board 304 with the antennas 305.

By way of example, the RFID reader 301 includes at least two antennas that are separated from each other and distributed in the edge of the mounting ring 302. As an example, the RFID reader 301 includes two antennas that are located opposite each other. In another example, the RFID reader 301 includes three antennas or four antennas that are equally spaced apart around the periphery of the disc 300, and each of the antennas reads a unique area above the disc 300. The disc 300 can also include antennas located elsewhere, such as a center of the disc 300.

Figure 4:
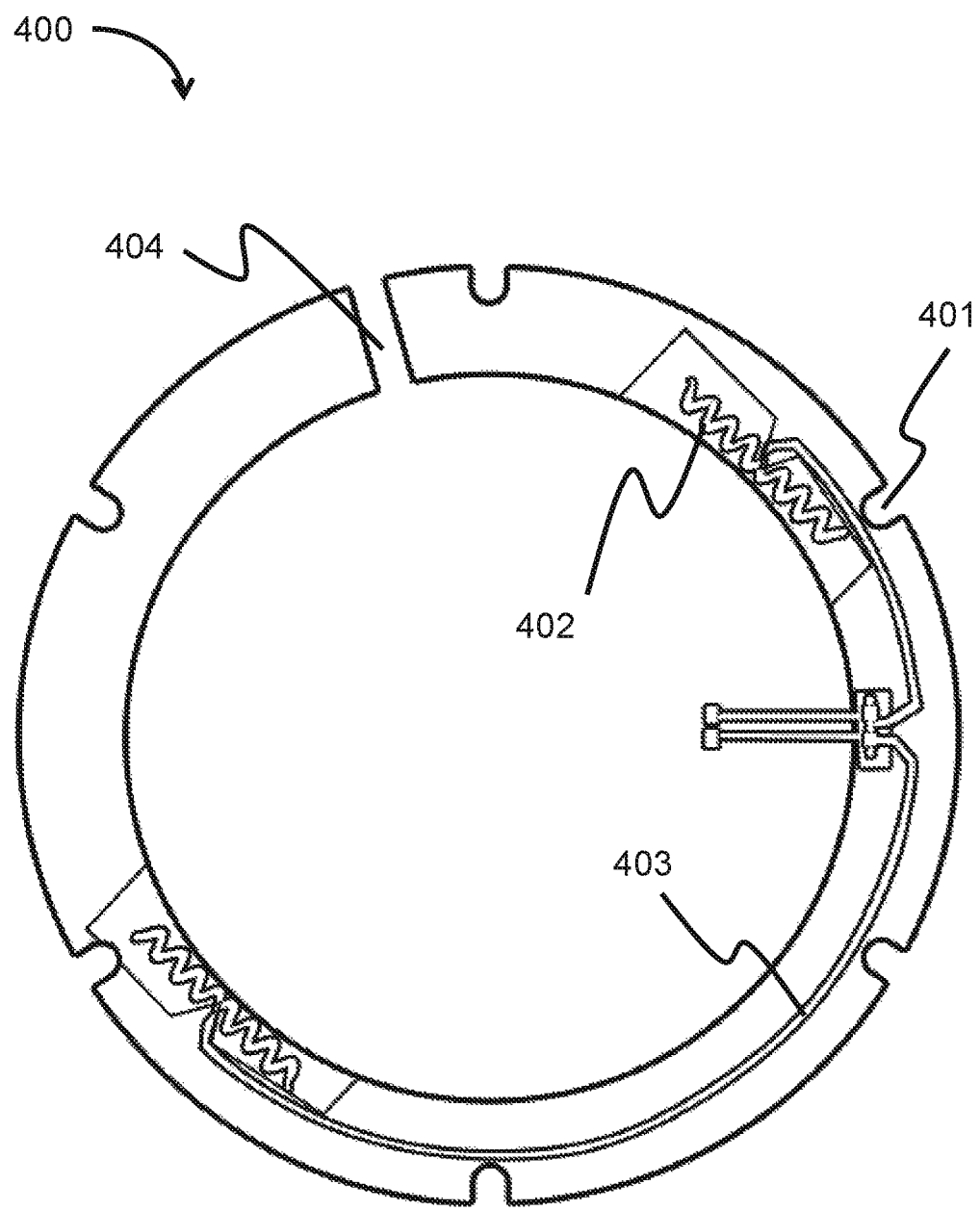
FIG. 4 illustrates a mounting ring in accordance with an example embodiment.

FIG. 4 illustrates a mounting ring 400 in accordance with an example embodiment. The mounting ring 400 supports antennas 402, to fix coaxial cables 403 and to facilitate integrating a RFID reader into a loading disc.

In an example embodiment, the mounting ring 400 has an inner diameter of 290 mm and an outer diameter of 376 mm. The antennas 402 are mounted on, embedded in or integrated with the mounting ring 400. The coaxial cables 403 are fixed on the mounting ring 400, for example, by a plurality of mounting pads that are distributed on the surface of the mounting ring 400.

In an example embodiment, the mounting ring 400 supports a plurality of antennas 402. The number of antennas 402 can be two or more. The antennas 402 are distributed with equal distance from each other at the edge of the mounting ring 400 to ensure the baggage tags in all directions being read correctly. For example, two antennas, three antennas, or four antennas are distributed around a periphery of the mounting ring 400.

In an example embodiment, the antennas 402 are sinusoidal meandered dipole for near-field communication. The antennas 402 are circular polarized so that the antennas 402 are not sensitive to tag-orientation. The length of the antennas 402 is between 110 mm and 126 mm.

In an example embodiment, the mounting ring 400 has an indent 401 or a plurality of indents distributed around the outer periphery of the mounting ring 400 for accommodating screws that fix the mounting ring with a disc.

In an example embodiment, the mounting ring 400 has a gap 404 that houses cables, such as a power cable, to avoid an uneven interface when integrating into a loading disc.

Figure 5:
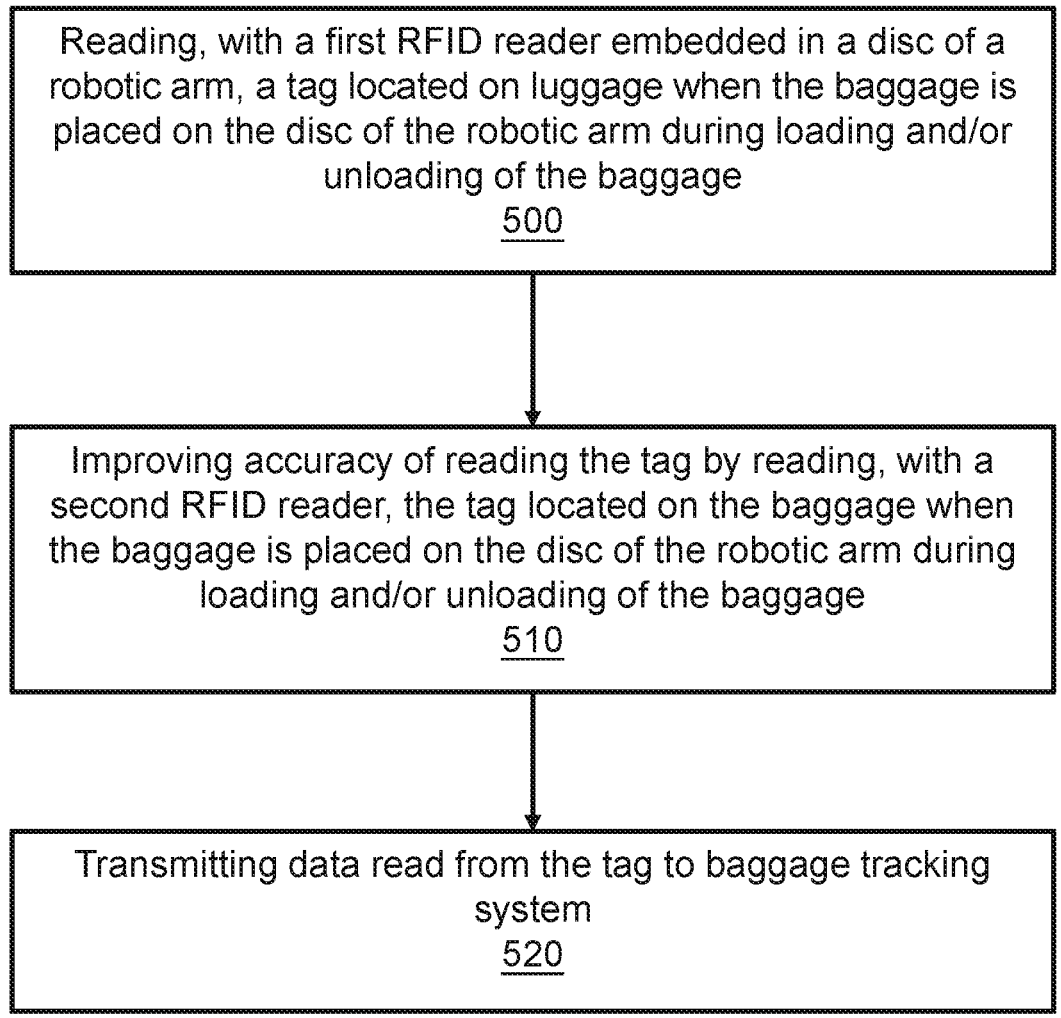
FIG. 5 is a method that improves accuracy when reading baggage during loading and/or unloading from a robotic arm with an example embodiment.

FIG. 5 shows a method that improves accuracy when reading baggage during loading and/or unloading from a robotic arm with an example embodiment.

In FIG. 5, block 500 states reading, with a first RFID reader embedded in a disc of a robotic arm, a tag located on baggage when the baggage is placed on the disc of the robotic arm during loading and/or unloading of the baggage.

In an example embodiment, the baggage recording system includes a first RFID reader that is embedded in or located on a disc located at one end of a robotic arm for receiving baggage. When the baggage is placed on the disc of the robotic arm for loading into or unloading from a container, the first RFID reader senses a baggage tag attached on the baggage and retrieves the data stored in the baggage tag.

Block 510 states improving accuracy of reading the tag by reading, with a second RFID reader, the tag located on the baggage when the baggage is placed on the disc of the robotic arm during loading and/or unloading of the baggage.

In an example embodiment, the baggage recording system includes a second RFID reader that is mounted on a pivot, an upright or a base connected with the other end of the robotic arm. When the baggage is placed on the disc of the robotic arm for loading into the container, the second RFID reader senses the baggage tag attached on the baggage and retrieves the data stored in the baggage tag.

In an example embodiment, the first RFID reader and the second RFID reader read the baggage tag simultaneously to provide redundant reading. By way of example, the first RFID reader and the second RFID reader both read when the disc is passing a predetermined position relative to the upright.

Redundant reading provides at least two advantages. First, redundant reading provides a confirmation that the data was indeed correctly read. This instance occurs when both the first and second RFID reader record the same tag information during the read. Second, redundant reading enables the system to read the baggage on tags that would not otherwise be readable with the RFID reader in the disc. For example, the baggage may be large and extend outside the area of the disc. The tag may be located outside the reading zone or area of the disc in this instance. The operator is not required to reposition or move the baggage so that the tag is read by the RFID reader in the disc since the tag in this instance is also read by the second RFID reader.

Block 520 states transmitting data read from the tag to a baggage tracking system.

In situation that only the second RFID reader reads the baggage tag, it transmits the information via wireless network to a baggage tracking system.

In situation that only the first RFID reader reads the baggage tag, the first RFID reader transmits the baggage tag information via Bluetooth to the second RFID reader, and the second RFID reader transmits the information via wireless network to a baggage tracking system.

In situation that both the first RFID reader and the second RFID reader read the baggage tag, the second RFID reader confirms the consistency of the information and transmits the information via wireless network to a baggage tracking system.

By incorporating two RFID readers in the baggage recording system and performing a redundant tag reading, a high read-rate and high accuracy is achieved.

In an airport baggage loading area, the lateral of a conveyor can accommodate multiple containers. The lengths of the containers are not uniform and vary from 156 cm to 407 cm. In a conventional baggage loading process, multiple containers may be opened at the same time for baggage loading. Recording of the baggage information and the association of the loaded baggage with a specific container are both made manually by manpower, which lacks efficiency and accuracy.

One or more example embodiments solve the problem by including a position sensor in the baggage recording system to determine the position thereof and executing a method that ensures a correct association between the baggage and the container holding the baggage.

Figure 6:
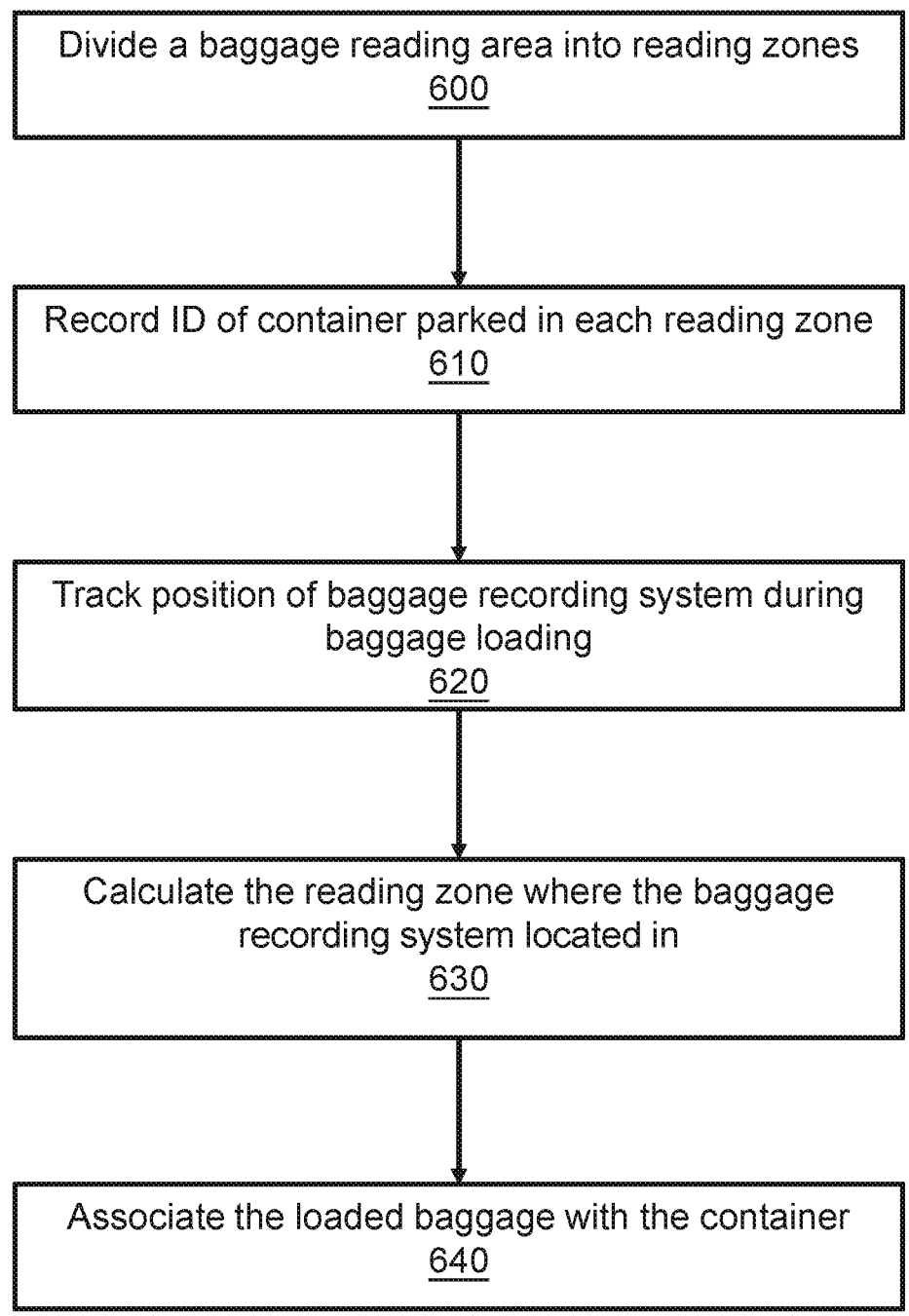
FIG. 6 illustrates a flow chart of a method that associates baggage with a container in accordance with an example embodiment.

FIG. 6 illustrates a flow chart of a method that associates baggage with a container in accordance with an example embodiment.

As shown in FIG. 6, the step 600 is to divide a baggage loading area into several reading zones. By way of example, the baggage reading area is divided into six reading zones with equal size. Each reading zone is registered uniquely in a computer.

The step 610 is to record an ID of a container parked in a reading zone to associate the container with the reading zone.

By way of example, when only one container is parked in the reading zone, then the container is associated with the reading zone in the computer.

By way of example, when one large container occupies more than one reading zone, the container ID is then associated with both of the two reading zones in the computer.

By way of example, more than one container is located inside the same reading zone, then only one of the containers is open at one time. The opened container is associated with the reading zone in the computer.

The step 620 is to track the position of a baggage recording system during baggage loading.

In an example embodiment, a position sensor is included in the baggage recording system. The position sensor measures the distance that the baggage recording system moves in the baggage reading area relative to a pre-determined start point.

The step 630 calculates the reading zone of the baggage recording system where it is located in.

Since the position of each reading zone has been determined in the step 600, the baggage recording system is associated with one specific reading zone when the position measured by the position sensor in step 620 falls within the boundary of the specific reading zone.

The step 640 associates the loaded baggage with the container. In this step, the baggage recording system is associated with the container that shares the same registration number of the reading zone, and thus all the baggage information recorded by the baggage recording system is precisely and automatically associated with the container.

As used herein, the term "airport back-end handling system" is a central server or computer that stores the data gathered from RFID readers, sensors, computer inputs, etc.

located throughout the airport and baggage handling facility, and monitors the working status of all the facilities in the airport by network.

As used herein, the term "translational movement" is a movement made by an object that the line segment connecting the initial position and the final position of each point in the interior of the object is parallel to each other and has the same length.

As used herein, the term "rotational movement" is a movement made by an object that every point in the object moves in a circular path around a line.

As used herein, the term "open" means the airport backend handling system allows baggage loading into a container.

As used herein, the term "close" means the airport backend handling system prohibits baggage loading into a container.

The method and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed by a software application, an electronic device, a computer, firmware, hardware, a processor, or a computer system. Furthermore, blocks and/or methods discussed herein can be executed automatically with or without instruction from a user.

What is claimed is:

1. An airport baggage recording system, comprising:
   a telescopic robotic arm that loads airport baggage and that has one end connected to an upright by a pivot and a second end connected to a disc;
   a radio frequency identification (RFID) reader in the disc that reads RFID tags on the airport baggage when the airport baggage is placed on the disc during loading; and
   a RFID reader located on the pivot that reads the RFID tags on the airport baggage when the airport baggage is placed on the disc during loading,
   wherein the RFID reader in the disc and the RFID reader on the pivot both read the RFID tags on the airport baggage to prevent errors in reading the RFID tags on the airport baggage during loading,
   wherein the RFID reader in the disc includes at least two antennas that are separated from each other and equally spaced apart around an edge of the disc, such that each of the antennas reads a different area above the disc, and
   wherein the disc includes a mounting ring that is located inside the disc along a periphery of the disc, and the mounting ring supports the at least two antennas and includes at least one coaxial cable that extends between the at least two antennas.

2. The airport baggage recording system according to claim 1, wherein the disc includes an upper layer and a lower layer, and the RFID reader in the disc is located between the upper layer and the lower layer.

3. The airport baggage recording system of claim 1, wherein the disc has a flat surface that receives the airport baggage during loading, the disc includes the at least two antennas embedded inside the disc and separated from each other in the disc, and the disc has a diameter larger than 376 mm.

4. The airport baggage recording system of claim 1, wherein the RFID reader in the disc includes two antennas that are located opposite each other and distributed on an outer periphery of the disc and a length of the antennas is between 110 mm and 126 mm.

5. The airport baggage recording system of claim 1, wherein the RFID reader in the disc and the RFID reader on the pivot simultaneously read the RFID tags on the airport baggage to perform redundant reads of the RFID tags in order to reduce errors in reading the RFID tags.

6. The airport baggage recording system of claim 1, wherein the RFID reader in the disc includes two antennas, and each of the antennas is a sinusoidal meandered dipole to improve reading of different orientations of the RFID tags on the airport baggage during loading.

7. The airport baggage recording system according to claim 1, wherein the inner diameter of the mounting ring is 290 mm, and the outer diameter of the mounting ring is 376 mm.

8. The airport baggage recording system according to claim 1, further comprising a computer that includes a processor, a memory and a baggage tracker, wherein the computer communicates with the RFID reader located on the pivot by a network and associates the baggage with a container.

9. The airport baggage recording system according to claim 8, wherein:
   the computer is configured to
      divide a baggage loading area into reading zones during loading, wherein each reading zone is uniquely registered in the computer; and
      record an ID of a container parked in a reading zone to associate the container with the reading zone;
   the baggage tracker includes a position sensor that is mounted at one side of the baggage loading area to determine a position of the airport baggage recording system in the loading area and send a position information to the processor and the memory; and
   the processor is configured to calculate the reading zone where the airport baggage recording system is located according to the position information, such that the baggage loaded in the reading zone recorded by the baggage recording system is associated with the container.

\* \* \* \* \*